Feb. 23, 1954  L. T. FREEMAN  2,669,919
ROTARY PLOW
Filed Aug. 24, 1951  3 Sheets-Sheet 1
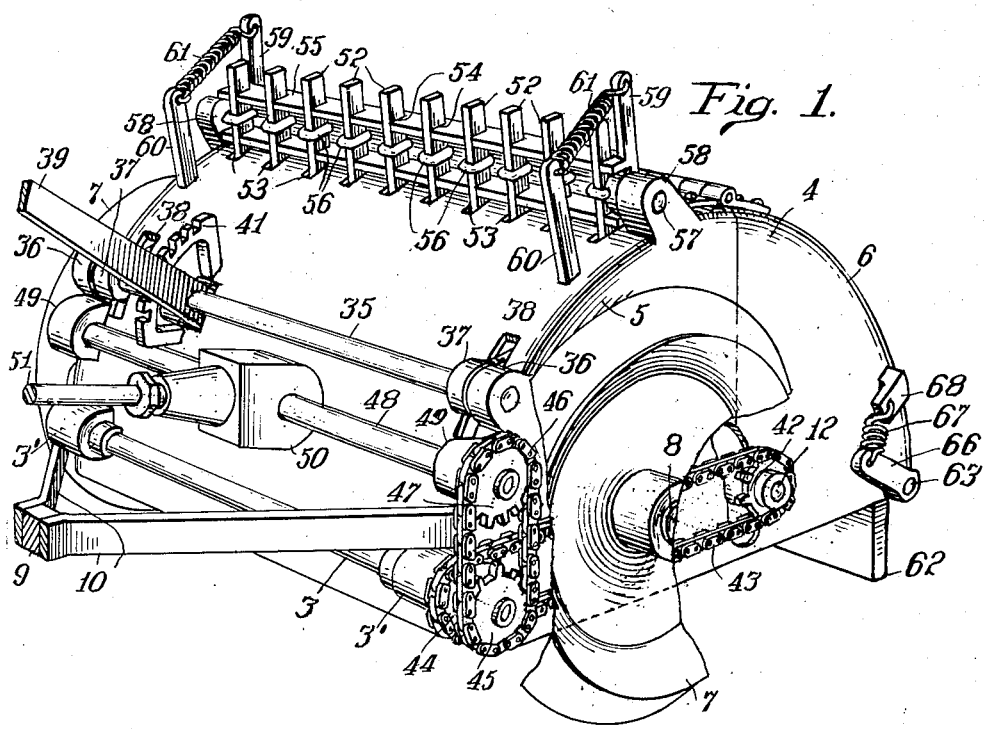
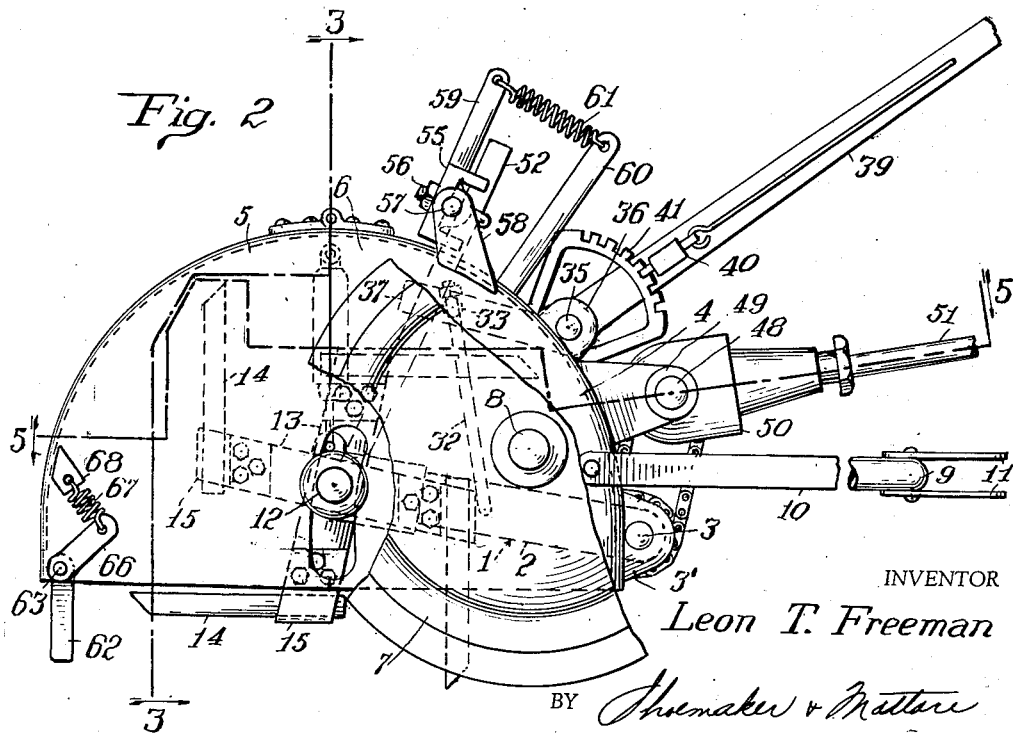
INVENTOR
Leon T. Freeman
BY Shoemaker & Mattare
ATTORNEY

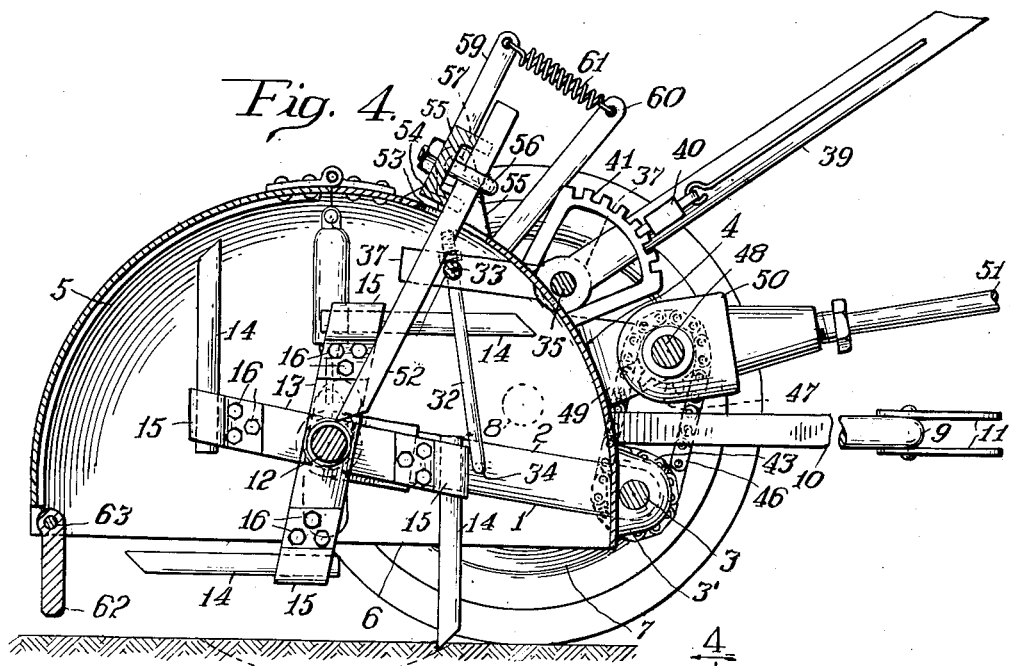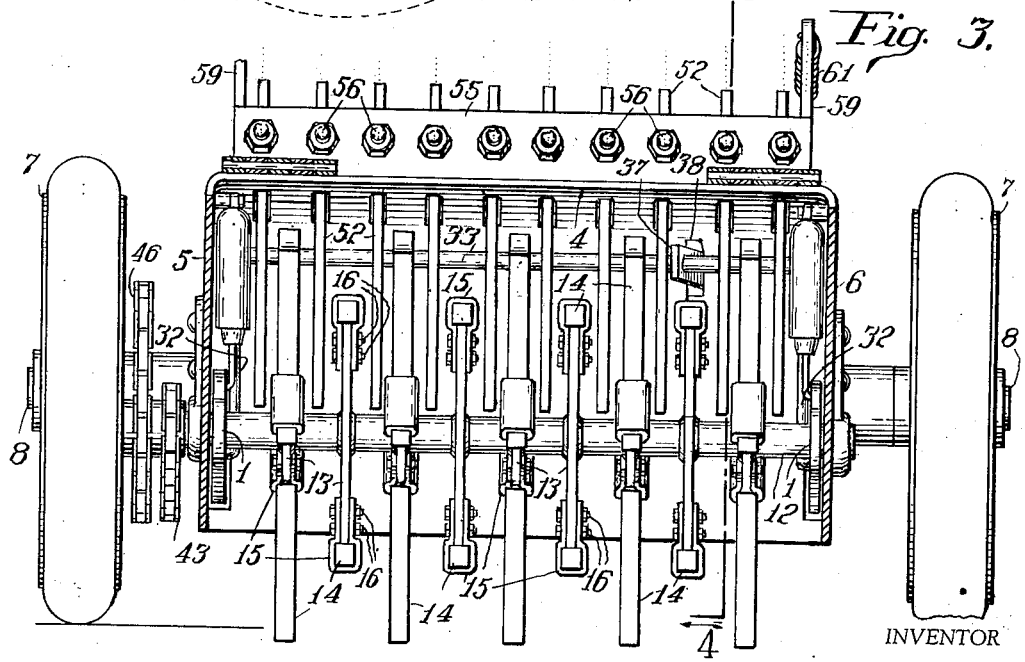

Feb. 23, 1954     L. T. FREEMAN     2,669,919
ROTARY PLOW
Filed Aug. 24, 1951     3 Sheets-Sheet 3
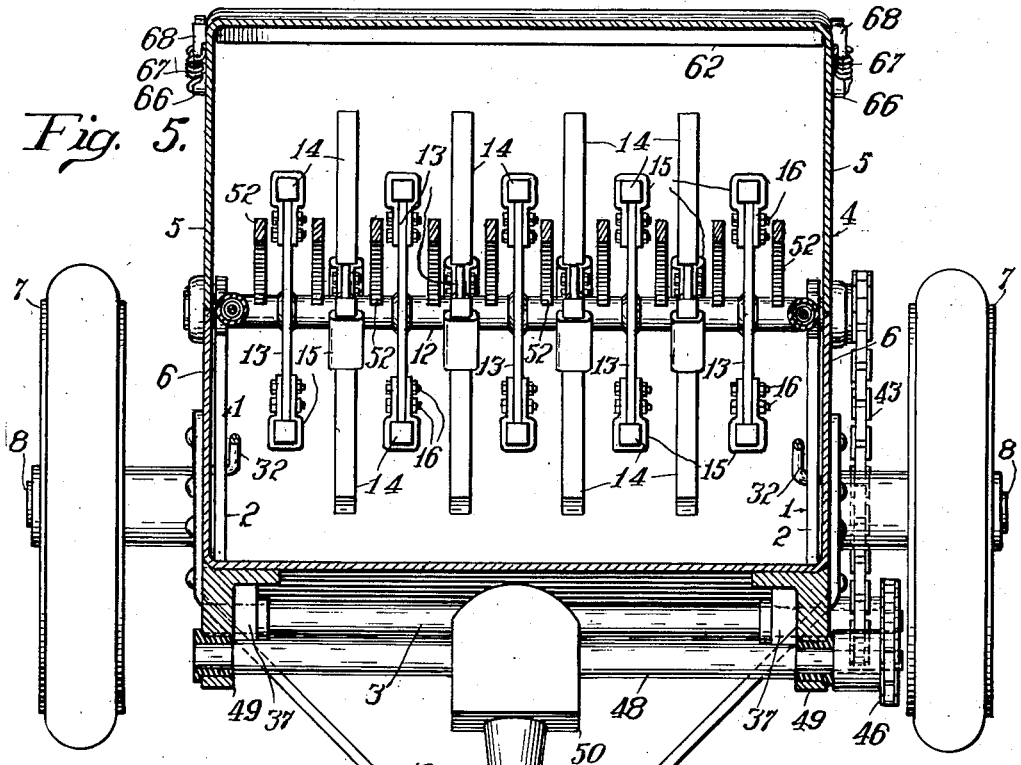
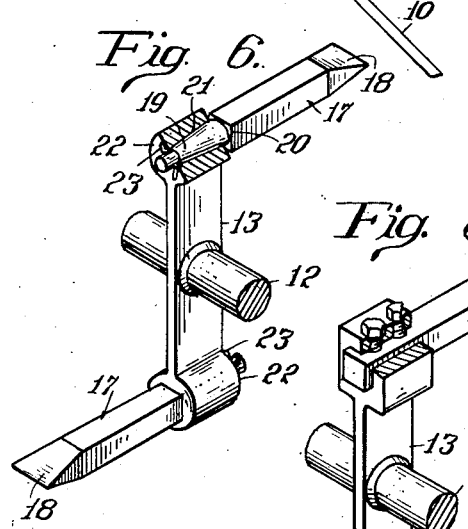
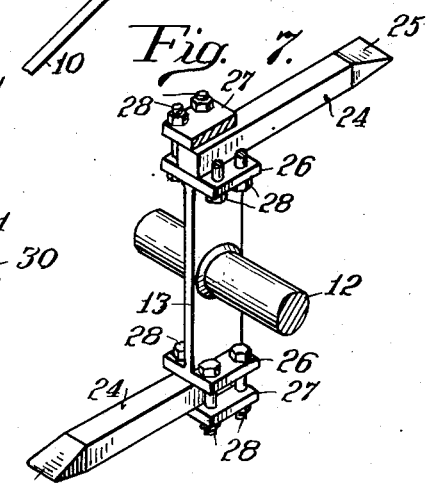
INVENTOR
Leon T. Freeman
BY Shoemaker & Mattare
ATTORNEY Patented Feb. 23, 1954

2,669,919

UNITED STATES PATENT OFFICE 2,669,919

ROTARY PLOW

Leon T. Freeman, New Milford, Pa.

Application August 24, 1951, Serial No. 243,425

12 Claims. (Cl. 97—40)

This invention relates to an agricultural implement and more particularly to a rotary plow.

It has been found difficult to plow rough and stony soil due to the fact that the soil is quite hard and, in addition, the teeth of a rotary plow are liable to be bent or deflected by stones in the ground and prevented from digging deep enough to form a good soil for growing crops.

It is, therefore, one object of this invention to provide a rotary plow wherein a shaft extending transversely of a frame for the plow is rotatably mounted and carries radially extending arms having at their outer ends teeth so formed and so disposed that the teeth move in a circular path spaced about the axis of the shaft and have such engagement with the ground that they dig quite deeply as they strike the ground with a downward movement similar to that of a pick and then move rearwardly through the ground.

It has also been found that rotary plows which are now in use have a tendency to become clogged by brush such as sage brush, blackberry bushes, corn stalks and the like.

It is, therefore, another object of the invention to provide a rotary plow with a rotatably mounted digger including spaced teeth for digging into the ground, there being associated with this rotary digger, a series of spaced blades arranged in staggered relation to the teeth of the rotary cutter, the space between the blades being such that the teeth of the rotary cutter will move between the blades and thus cause brush and similar growing vegetation carried upwardly by the teeth to be forced against sharpened rear edges of the blades with a shearing movement longitudinally of the blades and cut into small pieces which drop upon the ground and serve as fertilizer.

Another object of the invention is to mount the blades for shearing vegetation upon a cross bar mounted for pivotal movement and yieldably held against such movement in one direction. Therefore, the shearing or slicing blades will be braced against forward movement when in contact with vegetation adhering to the cutting teeth and the vegetation will be very easily cut into small pieces.

Another object of the invention is to provide a rotary plow wherein the rotary digger is supported by a frame so mounted that it may be moved vertically to adjusted positions and thus control the depth the teeth penetrate the ground during use of the machine.

Another object of the invention is to provide the machine with a hood which covers the frame and the rotary digger and also encloses major portions of the slicing blades which cooperate with the teeth of the digger, the hood serving to prevent vegetation from being cast away from the machine by centrifugal force during a plowing operation.

Another object of the invention is to provide a digger having teeth which are removably mounted so that they may be taken off for sharpening or replacement when necessary and, in addition, to so form the teeth that they will be very strong and not only not liable to be broken by contact with large stones, but capable of breaking the stones into small pieces upon striking them.

Another object of the invention is to provide a hood having a rear section hingedly mounted so that it may be swung upwardly to an open position permitting ready access to the rotary digger, there being across the rear end of the hood a gate or plate which extends downwardly and is capable of being swung rearwardly and upwardly to an opened position and thus allow large rocks, tree roots or the like to pass outwardly back of the hood instead of remaining under the hood where they will interfere with forward movement of the machine.

Another object of the invention is to provide a rotary plow having an improved arrangement of shafts and sprocket chains for transmitting rotary motion to the shaft of the rotary digger, one of the shafts of the power transmitting mechanism receiving its rotary motion by way of a shaft which extends forwardly from the machine and is adapted to be connected with a power take-off of a tractor.

Another object of the invention is to provide a rotary plow which is very efficient in operation and is not liable to be broken or otherwise rendered inoperative when used for plowing hard and rocky ground.

The plow of the improved construction is illustrated in the accompanying drawings wherein Figure 1 is a perspective view of the improved rotary plow with portions broken away.

Figure 2 is a side elevation looking at the opposite side of the plow from that shown in Figure 1.

Figure 3 is a transverse sectional view taken along the line 3—3 of Figure 2.

Figure 4 is a sectional view taken along the line 4—4 of Figure 3.

Figure 5 is a longitudinal sectional view taken along the line 5—5 of Figure 2.

Figure 6 is a perspective view upon an enlarged scale showing modified digging teeth and the manner in which they may be removably mounted.

Figure 7 is a perspective view similar to Figure 6 showing a modified form of clamp for removably securing digging teeth to arms of the rotary digger.

Figure 8 is a perspective view illustrating another modified manner of removably securing the digging teeth.

This improved rotary plow is adapted to be hitched back of a tractor and driven from the power take-off of the tractor. The frame 1 of the digger has side arms 2 which extend rearwardly from a shaft 3 rotatably mounted through bearings 3¹ extending forwardly from a hood 4. The hood 4 is open at its bottom and has a rear section 5 hinged to the rear end of its front section 6 so that the rear section of the hood may be swung upwardly to an open position and thus permit ready access to mechanism shielded by the hood.

Wheels 7 at opposite sides of the hood are mounted upon shafts 8 projecting from side walls thereof and of such size that when they are resting upon the ground, the lower edges of the walls of the hood will be spaced upwardly from the ground.

A draft bar 9, which is mounted between front ends of forks 10 extending from the hood, is of sufficient length to dispose the plow a sufficient distance back of a tractor when the coupling 11 at the front end of the draft bar is hitched to the tractor. This draft bar is adapted to dispose the plow in laterally off-set relation to the tractor and thus allow the plow to be drawn across a field to be plowed without the tractor moving along soil which has been dug up by the plow.

As the plow is drawn across the field, the ground is dug up by a rotary digger having a shaft 12 extending transversely of the hood and rotatably mounted in bearings at rear ends of the arms 2 of the frame. A plurality of spokes or arms 13 extend from the shaft 12 radially thereof in spaced relation to each other longitudinally of the shaft and, referring to Figure 4, it will be seen that the alternate arms or spokes 13 are disposed transversely of each other and preferably at right angles to each other. Therefore, during use of a plow, the diggers or teeth 14 carried by the arms or spokes at their outer ends, will not engage the ground at the same time. The teeth are each straight throughout their length and formed with a beveled outer end. This provides very strong teeth which resemble a chisel or pick and have a good cutting or digging action as they move downwardly and make contact with the ground.

In order to secure the teeth to the arms 13, each arm carries at its ends, clamps 15 which are secured to the arms by bolts 16 and having encircling engagement with the teeth. The clamps straddle the arms with the bolts passing through the arms and contacting portions of the clamps, and when the bolts are tightened, the teeth are tightly gripped and prevented from sliding longitudinally through the clamps. These teeth may be of an even thickness throughout their length, as shown, or they may taper slightly toward their inner ends. It will also be understood that the teeth may have their outer ends beveled for sharpening as shown in Figure 4 or they may be formed as shown in Figures 6, 7, and 8.

In Figure 6, the teeth 17 have their outer end portions widened and tapered to form blades 18 which may be referred to as a spade-type blade.

Inner end portions of these teeth 17 are reduced to form tapered stems 19 and shoulders 20 about their front ends. These stems fit into tapered sockets 21 formed in heads 22 at ends of the arms 13, the stems being of such length that their rear ends protrude slightly so that after a tooth has been applied, a cotter key 23 may be passed through an opening in the stem and thus eliminate any likelihood of the stem slipping forwardly out of the socket.

Figure 7 shows another modified form of tooth and securing means for the same. In this figure, the tooth 24 is of an even thickness throughout its length and at its front end has a cutting head 25 similar to the head 18. The rear end portion of the tooth 24 fits between a cross head 26 at the outer end of the arm or spoke 13 and a clamping plate 27 which is connected with the cross head by bolts 28. When these bolts are tightened, the clamping plate 27 is drawn into tight gripping engagement with the tooth 24 and holds it firmly in place.

The tooth 29, shown in Figure 8, has a wedge-shaped head 30 at its outer end, but the surface 31 of this tooth is beveled so that when the cutting edge of this type of tooth strikes the ground, a wedging action takes place and it will serve to chop rocks or hard soil. If any of the teeth shown strike large stones or rocks, they have a chopping action similar to that of a chisel and break the stones and rocks into small pieces.

During use of the plow, the frame must be vertically adjusted in order that the depth to which the teeth dig into the ground may be controlled. In order to do so, there has been provided hanger rods 32 which extend downwardly from a rod 33. This rod 33 extends transversely of the frame within the hood and lower ends of the hangers 32 are engaged through openings 34 formed through the arms 2 of the frame. A shaft 35 which extends transversely of the hood externally thereof is rotatably mounted through bearings 36 and this rod carries arms 37 which pass inwardly through slots 38 formed in the forward portion of the hood. Near their rear ends, the arms 37 are formed with openings through which end portions of the rod 35 pass. A latch lever 39, of such length that it may be reached by the operator of the tractor, is carried by the shaft 35 and its latch 40 engages teeth of the rack 41 so that after the lever has been moved to swing the frame vertically to an adjusted position, its latch will hold the lever stationary and the frame will be securely held in position to cause the teeth 14 to dig into the ground a desired depth during rotation of the rotary digger.

Rotary motion is to be transmitted to the rotary digger and in order to do so, the shaft 12 carries a sprocket wheel 42 about which engages a sprocket chain 43. This chain extends forwardly and is trained about a sprocket wheel 44 carried by the shaft 3. The shaft also carries a sprocket wheel 45 about which engages a sprocket chain 46 extending upwardly and trained about a sprocket wheel 47 carried by a shaft 48 which is rotatably mounted through bearings 49 projecting forwardly from the hood. The shaft 48 passes through a gear housing 50 in which is gearing of conventional form so that rotary motion will be imparted to the shaft 48 from the shaft 51. This shaft 51 extends forwardly from the gear housing and at its front end is adapted to be connected with a conventional power take-off of a tractor in the usual manner. It will thus be seen that if the plow is drawn forwardly by a tractor, rotary motion will be transmitted to the shaft 12 and the teeth of the rotary digger will move in a circular path about the axis of the digger, and upon striking the ground, will first penetrate the ground and then have movement rearwardly through the ground and upwardly out of the ground. The hard ground will thus be operated upon with a striking motion similar to that of a pick, the teeth then moving rearwardly and upwardly out of the ground. As the teeth move in a circular path, they will form trough-shaped cuts in the hardpan under broken soil and if the plowing is done across hilly ground, trough-shaped cuts or trenches will be formed which will serve to hold rain water and also prevent water from flowing down hill too rapidly and causing erosion of the soil. In addition, by so moving the plow across a field having too much moisture, drainage troughs may be formed beneath the plowed portion of the ground so that surplus water will drain from the ground.

When this plow is used upon ground covered with sage brush, blackberry bushes and other vegetation of a similar nature, the digging teeth after moving rearwardly through the ground and upwardly, catch the sage brush or blackberry bushes and portions thereof are carried upwardly with the teeth and the arms. This vegetation which is carried upwardly and forwardly by the teeth and the arms would be liable to choke the plow. In order to prevent this, there has been provided a plurality of blades 52 which may be referred to as shearing blades or slicing blades. These blades are quite long and pass vertically through openings 53 formed in the upper portion of the hood. The blades are disposed in staggered relation to the teeth, and the arms or spokes carrying them, and have their lower ends terminating near the shaft 12. Upper or outer end portions of the blades fit into notches or recesses 54 formed in flanges of a cross bar 55 formed of channel metal, and fasteners 56 which may be J bolts or U bolts are employed to firmly secure the blades to the cross bar. Ends of the cross bar are formed with stems or trunnions 57 rotatably mounted through bearings 58 carried by the frame 1. Arms 59 project upwardly from ends of the cross bar and have their upper ends connected with anchoring arms 60 by helical springs 61 which exert forward pull upon the arms 59 and thus cause the cross bar to be rocked in such a direction that the portions of the blades within the hood will be urged rearwardly, this rearward movement of the blades being limited by contact of the lower flange of the cross bar with the hood. When bushes or similar vegetation carried upwardly and forwardly by the teeth and the arms engage the sharpened rear edges of the blades, a slicing action takes place which causes the blades to cut the vines or bushes into small pieces which drop upon the ground and serve as fertilizer.

If large roots or rocks are encountered which cannot be carried upwardly by the digging teeth, it is desired to allow them to pass rearwardly out of the hood. In order to do so, there has been provided a gate or plate 62 which extends transversely of the hood in depending relation thereto along its rear edge. This plate or gate is pivotally mounted by stems or trunnions 63 which pass through and project outwardly from side walls of the hood and carry lever arms 66. These lever arms extend upwardly at a forward incline and are engaged by springs 67 anchored to ears 68. Ordinarily, the springs 67 retain the gate in the perpendicular position shown in Figures 2 and 4, but if a rock or large root is dug up and rests upon the ground, contact of the same with the gate will swing the gate rearwardly and upwardly to an open position allowing passage of the root or rock out of the hood.

While a practical embodiment of the invention has been illustrated and described, it will be understood that changes in construction which come within the scope of the claims may be made.

What is claimed is:

1. In an agricultural implement, a frame, a shaft extending transversely of the frame and rotatably mounted, arms extending from said shaft and spaced from each other longitudinally thereof, diggers carried by said arms, a hood over said frame, a cross bar over said shaft and its arms disposed above said hood and pivotally mounted for transverse rocking movement, shredding blades extending downwardly from said cross bar through openings in the hood and disposed forwardly of the shaft between said arms, means for imparting rotary motion to said shaft, and means yieldably holding said cross bar against turning movement in one direction and allowing limited turning of the bar when the shredding blades are subjected to excessive pressure by material carried toward the shredding blades by the diggers.

2. In an agricultural machine, a frame, a hood over said frame open at its bottom and having side walls and front and rear wall portions, ground wheels at opposite sides of said hood supporting the hood and the frame in upwardly spaced relation to the ground, a shaft under said hood rotatably supported across said frame, arms extending radially from said shaft and spaced from each other longitudinally thereof, clamps at outer ends of said arms disposed at an outward incline relative to the circumference of the shaft, diggers removably and adjustably mounted through said clamps with outer portions projecting therefrom and sharpened at their ends, a cross bar mounted over said hood longitudinally of said shaft, and shredder blades extending downwardly from said cross bar into said hood through openings therein and disposed in spaces between the diggers during rotation of the shaft.

3. In an agricultural machine, a frame, a hood over said frame and in which the frame is mounted, ground wheels at opposite sides of said hood, a shaft under said hood rotatably carried by said frame transversely thereof, arms extending laterally from said shaft and spaced from each other longitudinally thereof, diggers carried by said arms and moving in a circular path during rotation of the shaft, a cross bar pivotally mounted over said hood transversely thereof, blades extending downwardly from said cross bar into said hood through openings formed in the forward portion thereof and disposed forwardly of the shaft between said arms, members extending upwardly from said cross bar, springs connected with said members and exerting pull to yieldably resist tilting movement of the blades away from the shaft and cause vegetation clinging to the diggers and the arms and confined by the blades to be severed by the blades, and means for imparting rotary motion to said shaft.

4. In a rotary plow, a frame, a shaft rotatably mounted transversely of said frame, diggers carried by said shaft in transverse spaced relation to each other and moving in a path circumferentially of the shaft during rotation of the shaft, means for vertically adjusting said frame and thus controlling the depth the diggers enter the ground, means for rotating said shaft, a hood covering the frame and the diggers and formed with openings disposed over said spaces between the diggers, a pivoted bar over said hood, vertically adjustable blades carried by said bar and passing through the openings in position for passage of said diggers between them and thereby serving to cut into small pieces brush carried upwardly by the diggers and dislodging the cut brush from the diggers.

5. In a rotary plow, a frame, rotary digging means carried by said frame and including teeth adapted to enter the ground and then move rearwardly and upwardly out of the ground and forwardly and downwardly for again entering the ground, slicing blades over said digging means disposed in staggered relation to said teeth for cutting brush and other vegetation carried upwardly by the teeth into small pieces and dislodging the same from the teeth, means for rotating said digging means a hood covering the frame and the digging means, said hood being formed with openings through which the slicing blades pass, ears carried by said hood, a cross bar rockably mounted between said ears and to which the blades are secured, arms extending from the cross bar, arms extending from said hood, and springs extending between and attached to the arms of the cross bar and the hood and exerting pull to turn the cross bar and urge the blades rearwardly.

6. The structure of claim 5 wherein the digging means consists of a rotatably mounted shaft, arms carried by the shaft and extending radially from the shaft in longitudinally spaced relation to each other, clamps at outer ends of said arms disposed diagonally at an outward incline, and cutting teeth removably mounted through the clamps and having outer ends sharpened.

7. The structure of claim 5 wherein the hood has a front section and a rear section hinged to the front section for swinging movement rearwardly and upwardly to an open position, a gate extending horizontally under the rear edge of the rear hood section and pivoted along its upper edge to the said rear hood section for rearward movement outwardly and upwardly to a raised position, arms rigid with opposite ends of said gate, and springs connected with said arms and yieldably resisting rearward movement of the gate.

8. In a rotary plow, a frame, rotary digging means carried by said frame and including a shaft and spokes extending radially therefrom and carrying teeth extending substantially circumferentially of the digging means and adapted to enter the ground and move rearwardly and upwardly out of the ground and then forwardly and downwardly to re-enter the ground during rotation of the digging means, a hood covering the frame and the digging means and formed with openings spaced from each other transversely of the frame, a cross bar over said hood rockably mounted and disposed above the openings, slicing blades disposed substantially vertically over said digging means and passing through the openings in the hood and secured to said cross bar, portions of the blades within the hood being disposed in staggered relation to the teeth in position for engaging between the teeth and cutting vegetation carried upwardly and forwardly by the teeth into pieces and dislodging the same from the teeth during rotation of the digging means, arms extending from said cross bar, and springs over said hood extending transversely of said cross bar and connected with said arms and exerting pull to turn the cross bar and urge the blades rearwardly between forwardly moving teeth.

9. In a rotary plow, a frame, rotary digging means extending transversely of said frame and including picks extending laterally of the digging means and spaced transversely from each other, a hood over said digging means formed with openings spaced transversely from each other, bearings, a rocker bar above said hood extending transversely of the hood and rotatably supported by said bearings, blades carried by said bar and extending downwardly through the openings in staggered relation to said picks and in position for engaging between the picks and cutting vegetation tangled with the picks into small pieces and dislodging the cut vegetation from the picks during rotation of the rotary digging means, and spring means yieldably resisting turning of the rocker bar.

10. The structure of claim 9 wherein the rocker bar has upper and lower flanges along one side thereof, said flanges being formed with slots into which portions of the blades above the hood fit, and fasteners carried by said rocker bar in crossed and gripping engagement with the blades, said fasteners releasably holding the blades in the slots, and the fasteners when loosened allowing movement of the blades through the slots to vertically adjusted positions.

11. In a rotary plow, a frame, a rotary digger including a shaft carried by said frame transversely thereof, arms rigid with said shaft and extending radially therefrom and spaced from each other longitudinally of the shaft, picks carried by said arms and extending from outer ends thereof in a direction substantially circumferentially of the shaft and sharpened at their outer ends, said picks moving downwardly and rearwardly in a digging stroke and then upwardly and forwardly over the shaft and again downwardly during rotation of the shaft, a hood over said rotary digger formed with openings disposed forwardly of the shaft, a rocker bar over said hood extending transversely thereof and pivotally mounted, shearing blades carried by said rocker bar and passing downwardly through the openings in the hood at a rearward incline in position disposing them between the forwardly moving arms and picks in crossing relation thereto and terminating near the rotary shaft, said blades being sharpened along rear edges and serving to engage vegetation carried upwardly and forwardly by the arms and the picks carried thereby and cutting the vegetation into small pieces, and springs means yieldably resisting pivotal movement of the rocker bar in one direction and urging lower portions of the blades rearwardly when engaged by the forwardly moving vegetation.

12. In a rotary plow, a frame, a rotary digger including a shaft carried by said frame transversely thereof, arms rigid with said shaft and extending radially therefrom and spaced from each other longitudinally of the shaft, picks carried by said arms and extending laterally from outer ends thereof in spaced relation to the shaft in a direction substantially circumferentially of the shaft and sharpened at their outer ends, said picks moving downwardly and rearwardly in a digging stroke and then upwardly and forwardly over the shaft and again downwardly during rotation of the shaft, a hood over said rotary digger, vertical shearing blades mounted above the hood and extending downwardly into the hood through openings therein and disposed in position between the arms and the picks diagonally thereof at a rearward incline toward their lower ends and having their lower ends terminating close to the rotary shaft and adjacent inner ends of the arms, said blades serving to confine vegetation at the junction of upwardly and forwardly moving arms and picks and cut the vegetation into small pieces during rotation of the rotary digger.

LEON T. FREEMAN.

References Cited in the file of this patent

UNITED STATES PATENTS

| Number | Name | Date |
| --- | --- | --- |
| 154,489 | Jones et al. | Aug. 25, 1874 |
| 988,030 | Quellennec | Mar. 28, 1911 |
| 1,085,508 | Talbot et al. | Jan. 27, 1914 |
| 1,676,646 | Funk | July 10, 1928 |
| 2,214,702 | Seaman | Sept. 10, 1940 |
| 2,283,744 | Lethlean | May 19, 1942 |
| 2,424,014 | Bobeldyk | July 15, 1947 |
| 2,465,488 | Sears et al. | Mar. 29, 1949 |
| 2,558,822 | Claus | July 3, 1951 |

FOREIGN PATENTS

| Number | Country | Date |
| --- | --- | --- |
| 597,850 | Great Britain | Feb. 4, 1948 |